United States Patent [19]

Hediger

[11] Patent Number: 4,913,526

[45] Date of Patent: Apr. 3, 1990

[54] OPTICAL LED PRINTHEAD WITH LENS LOCATOR BAR

[75] Inventor: Edwin A. Hediger, Fairport, N.Y.

[73] Assignee: Eastman Kodak Company, Rochester, N.Y.

[21] Appl. No.: 239,252

[22] Filed: Sep. 1, 1988

[51] Int. Cl.$^4$ .................. G02B 7/02; G02B 6/04; G03B 27/00

[52] U.S. Cl. .................. 350/252; 350/96.1; 355/1; 355/238

[58] Field of Search .................. 350/252, 253, 96.1, 350/96.24, 96.27, 320; 355/1, 237, 238; 354/5; 346/107 R; 358/293

[56] References Cited

U.S. PATENT DOCUMENTS

| | | | |
|---|---|---|---|
| 4,059,345 | 11/1977 | Kawamura et al. | 350/252 |
| 4,147,412 | 4/1979 | Kawamura et al. | 350/252 |
| 4,447,126 | 5/1984 | Heidrich et al. | 350/96.31 |
| 4,536,778 | 8/1985 | De Schampherlaere et al. | 346/160 |
| 4,566,170 | 1/1986 | Dolan | 29/569 |
| 4,653,894 | 3/1987 | Pease | 355/1 |
| 4,712,018 | 12/1987 | Stoffel et al. | 250/578 |
| 4,715,682 | 12/1987 | Koek et al. | 350/253 |
| 4,728,981 | 3/1988 | Koek et al. | 355/1 |
| 4,740,803 | 4/1988 | Hardy | 355/1 |
| 4,750,010 | 6/1988 | Ayers et al. | 346/107 |

Primary Examiner—Bruce Y. Arnold
Assistant Examiner—Ronald M. Kachmarik
Attorney, Agent, or Firm—J. R. Hanway

[57] ABSTRACT

Optical printhead for hard copy printers and copiers. The printhead includes a fiber optic lens array having a reinforcing and locating bar permanently bonded to the side and exact center of the lens. The bar has a dimension parallel to the axis of the fibers which is much more accurate than the length of the lens along the same axis. Centering of the lens array is easily and accurately accomplished by centering the bar. The bar also stiffens and straightens the lens array to maintain desired focal characteristics. The printhead also includes an accurately dimensioned mounting plate which is used to attach the printhead to the printer. A stress relieving structure is used to support the electronic circuitry and LED's in the printhead from a rigid heat sink.

14 Claims, 5 Drawing Sheets

OPTICAL LED PRINTHEAD WITH LENS LOCATOR BAR

BACKGROUND OF THE INVENTION

1. Field of the Invention

This invention relates, in general, to optical printheads and, more specifically, to LED printheads for use in copiers, duplicators, printers, and like devices which produce hard copies.

2. Description of the Prior Art

Optical printheads are used in copiers, duplicators, and printers to expose a photoconductive surface or film in the apparatus in such a manner that a latent image is formed on the film. The image is then developed and transferred to paper for producing a hard copy output from the apparatus. Many optical printheads use light emitting diode (LED) arrays to generate the radiation or light necessary to expose the photoconductive film. The light from the LED's is focused by a lens system upon the surface of the film, and the LED's are selectively controlled electronically to produce the amount of light necessary to construct an image on the photoconductive film.

Linear fiber optic lens arrays are usually constructed with a fiber glass reinforced case or enclosure around the optical fibers. While such an enclosure sufficiently supports and fixes the location of the fibers relative to each other, the overall dimensions of the array are not exact enough for use with high resolution systems, such as an LED printhead. In addition to dimensional variation between lens arrays, the arrays are not usually straight enough to be usable without some method of stiffening and straightening the array.

The dimension of the lens array which is parallel to the axis of the individual fibers is typically on the order of ± approximately 5.5%. With a lens length of 16.3 mm, this translates to a tolerance of ±0.9 mm. Very accurate focusing cannot be achieved in apparatus which uses the design lens length for positioning because of the large tolerance of that dimension. The center of the lens length is more important in many alignment procedures than the overall length of the lens array. However, because of the dimensional inaccuracy of typical lens arrays, finding the center requires more than measuring or locating a known distance from an end of the lens.

To overcome these problems, various prior art arrangements have been used to compensate for the wide tolerances. U.S. Pat. Nos. 4,059,345 and 4,147,412, issued on Nov. 22, 1977 and Apr. 3, 1979, respectively, address the problem of lens location in electrophotographic apparatus. These patents disclose a mounting arrangement (FIG. 5) wherein the lens has grooves located at its center. The grooves align and hold the lens to fixed mounts permanently located between the image and object planes. Another embodiment (FIG. 4) of these patents requires a hole at the center of the lens to align the lens accurately between the image and object planes. A third embodiment (FIG. 3) uses a sleeve around the lens array which extends below the lens a distance necessary to locate the center of the lens at a desired position. U.S. Pat. No. 4,653,894, issued on Mar. 31, 1987, uses pins which extend into locating holes in the lens array to mount and position the lens in copy machines.

Since the center of the lens array needs to be located at a precise point to properly focus the lens, it is important that establishment and use of the center of the lens be accomplished as easily as possible. Therefore, it is desirable, and it is an object of this invention, to provide a printhead having a lens array which can be easily aligned because the center of the lens is readily located. It is also desirable, and another object of this invention, to provide a printhead having a lens array which is structurally straighter and stiffer than conventional lens arrays.

SUMMARY OF THE INVENTION

There is disclosed herein a new and useful printhead assembly having a specially fabricated lens array. The array includes a linear fiber optic lens system surrounded by a fiberglass reinforced case or enclosure. After the lens is suitably flexed to an exact rectangular shape, a reinforcing and locating bar is permanently bonded to the array enclosure. The bar is located at the exact center of the lens array and has a dimensional tolerance much more precise than that of the lens array in the direction parallel to the axis of the optical fibers. Since the bar is dimensionally much more accurate than the lens, centering the bar in the printhead during alignment is easier than centering the lens. However, since the lens is centered with the bar during the bonding or attachment process, the lens is also centered when the bar is centered.

The lens array is positioned in a rectangular opening of a precisely dimensioned mounting plate. A set screw and shim arragement moves the lens in one direction for alignment over the LED's of the printhead. Adjustment of the lens up and down in the opening focuses the light from the LED's to a distance where the photoconductive film will be located, and such adjustment is made by using the easier centering provided by the applied locating bar.

Other significant features of the printhead construction include registration surfaces on the lens mounting plate to quickly align the printhead in the associated apparatus. Two perpendicular surfaces on the plate are precisely dimensioned to contact abutting surfaces in the apparatus and quickly establish the exact location of the printhead. The mounting plate is supported from a rigid heat sink structure by end plates which enclose the circuit assemblies containing the LED's on two sides. The remaining two sides of the circuit assemblies are enclosed by side bars connected between a printed circuit board and the mounting plate. The printed circuit board is electrically connected to the LED circuit assemblies and positioned between the heat sink and the mounting plate and includes a rectangular opening therein in which the circuit assemblies, which are construted in modular form, are located. The circuit assemblies are attached to a specially constructed backing plate which cooperates with a pin and slot arrangement between the backing plate and the heat sink to provide a rigid supporting structure which is movable in predefined directions to compensate for differences in the thermal coefficients of expansion of the materials used to construct the heat sink and the circuit assembly backing plate.

The unique construction features of the printhead disclosed herein permit easy alignment of the lens array, convenient interchangeability of prefocused printheads between different printer apparatus, and complete enclosure and protection of the delicate surface components without the need for a separate transparent cover.

Additionally, component adjustments can be made on the printed circuit board outside of the sealed area, and ease of testing and assembly of the LED circuit assemblies is furnished by reason of their modular construction. A method of aligning the lens in the printhead is also disclosed herein.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
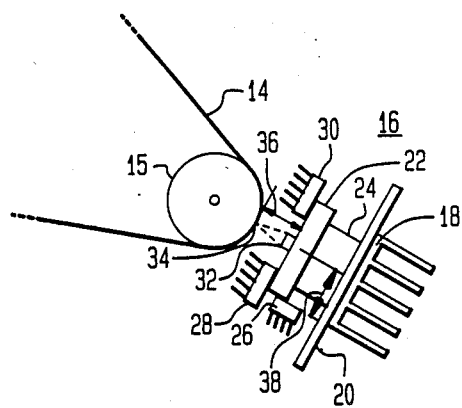
FIG. 1 is a schematic view of a printhead assembly showing its relationship to a photoconductive surface.

Throughout the following description, similar reference characters refer to similar elements or members in all of the figures of the drawing.

Referring now to the drawing, and to FIG. 1 in particular, there is shown a schematic view of a printhead construted according to this invention and its relationship to a photoconductive member which is exposed by the printhead. The photoconductive film or web 14 travels around the roller 15 and is selectively exposed by radiation from light emitting diodes (LED's) contained within the printhead 16. The control electronics for selectively activating the printhead LED's in synchronization with the movement of the film 14 is not illustrated in FIG. 1. The printhead 16 includes the rigid heat dissipating structure or heat sink device 18, the printed circuit board 20, the mounting and registration plate 22, and the supporting and enclosing structure 24.

The components of the printhead 16 are arranged such that the printhead contains in one package all of the critical and essential components for an operational printhead. Thus, the printhead 16 can be removed easily from one machine and replaced by another printhead without alignment and adjusting procedures being required. According to FIG. 1, the mounting and registration plate 22 provides the complete means for securing the total printhead in the associated machine or apparatus. Reference supports 26, 28 and 30 in the machine coincide with precise surfaces on the plate 22 to align the printhead with respect to the photoconductive film 14. Although shown in schematic form in FIG. 1, an actual machine would include other mechanical members or fasteners which would secure the plate 22 against the reference supports 26, 28 and 30. It can be seen from FIG. 1 that the printhead 16 contains the necessary components and that these components are integrally connected to each other and aligned with respect to the plate 22. Not only does this permit quick and convenient removal and replacement of printheads in the associated apparatus, it also offers other advantages, such as providing a totally enclosed printhead which keeps out contamination to the LED's and the bonding wires associated therewith.

The lens 32 is securely fastened in the plate 22 at a predetermined position such that the radiation or light from the LED's focuses at point 34 on the photoconductive film 14 when the printhead 16 is properly in position. When properly in position, the printhead is spaced a fixed dimension 36 from the photoconductive film 14 and is aligned in the other required direction by the fixed distance 38, which is also governed by the precise surfaces on the plate 22 and the support 26. Details of the printhead 16 are included elsewhere in this description. However, it is emphasized here that the printhead 16 is specifically constructed for easy and convenient removal and insertion into its associated apparatus without further adjustments being required.

Figure 2:
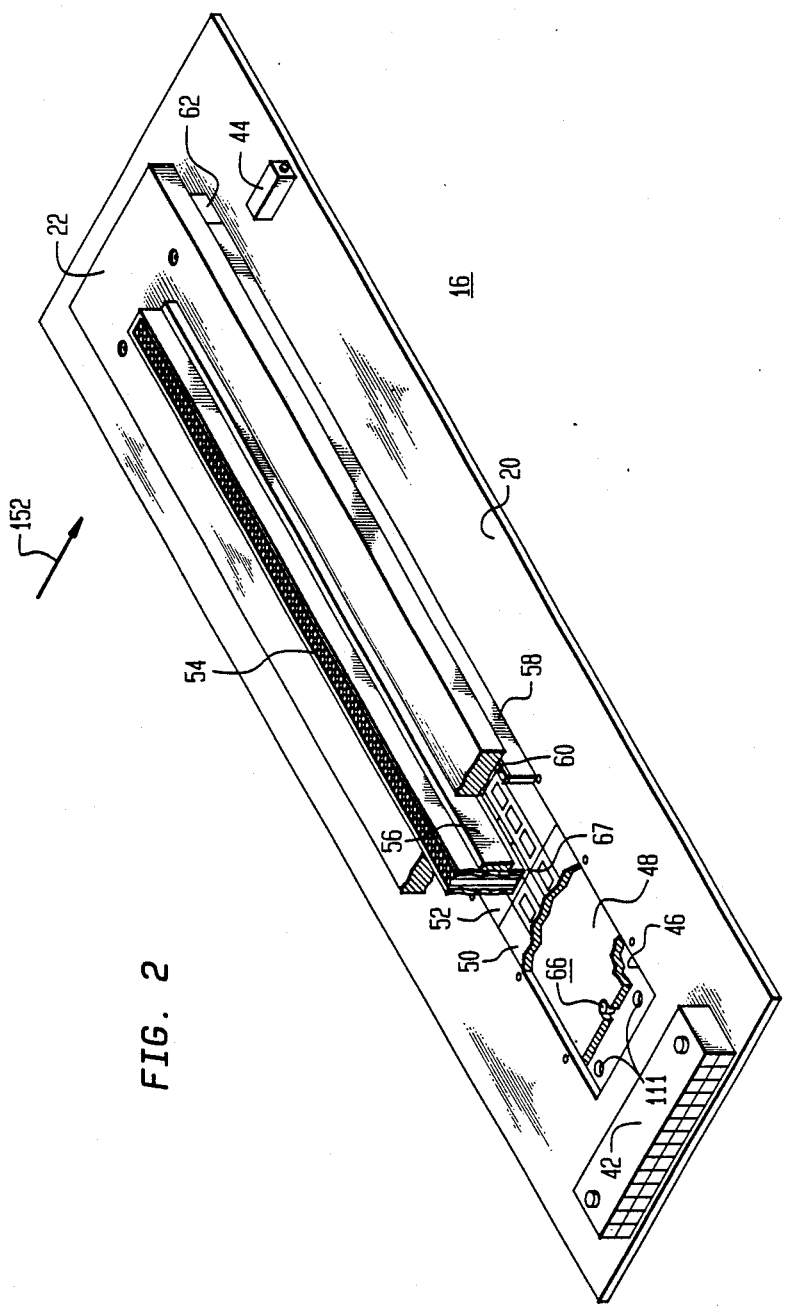
FIG. 2 is a perspective view of the printhead of this invention, partially cut-away for clarity.

FIG. 2 is a perspective view of a printhead constructed according to this invention with a portion thereof partially cut-away for clarity of the figure. In FIG. 2, the printhead 16 includes the printed circuit board 20 on which the connector 42 and the trimmer resistor 44 are located. Various other components may be located on the printed circuit board 20, but are not shown in FIG. 2 in the interest of clarity. Connector 42 can be used to connect the printhead 16 to the electronic control circuits needed to synchronize the operation of the LED's in the printhead with the movement of the photoconductive film. Trimmer resistor 44, along with other components mounted on the printed circuit board 20, can be used for adjustments to the internal circuits of the printhead, including the LED arrays. Normally, some types of adjustments are necessary to compensate for various outputs of the LED's to bring them within acceptable levels for adequate film exposure. One advantage of the printhead 16 shown in this invention is that these controls and adjustments are accessible on the outside of the printed circuit board rather than being enclosed within the enclosed area which contains the LED's and their associated driver integrated circuits.

The printed circuit board 20 includes a rectangular opening 46 in which the internal circuits of the printhead are located, as will be described in more detail later herein. Underneath the opening 46 is located a backing plate 48 which is larger than the opening 46 and extends underneath the printed circuit board 20 for a short distance beyond the edges of the opening 46. The mother board or backing plate 48 has disposed or attached thereto a plurality of daughter boards, or tiles, such as tiles 50 and 52. These tiles contain the electronic elements needed by the printhead to produce the light for exposing the photoconductive film. Details of these daughter boards or tiles will also be described in more detail later herein.

A linear fiber optic lens 54, having attached thereto a stiffening, straightening, and locating bar 56, is secured within a rectangular opening of the mounting and registration plate 22. The lens 54 focuses the radiation or light from the LED's contained on the tiles to the photoconductive film. In order for the modular printhead to be interchangeable with other apparatus, it is necessary that the lens 54 be accurately positioned and aligned within the plate 22. In addition to the lens alignment, it is also necessary that certain surfaces on the plate 22 be precise and accurate for providing a reference or registration plane which determines the spacing of the printhead from the photoconductive film in the associated apparatus.

Also shown in FIG. 2 is supporting member 58 which has a gasket type foam material 60 located between the junction of the member 58 and the plate 22 to provide a sealed chamber around the LED electronics. An end plate support member 62 supports the plate 22 from a structural heat sink located underneath the PCB 20. A similar end support member would be positioned at the other end and screws protruding through openings 111 of the heat sink would be used to secure the plate 22 and the support member. A slot, or notch, and pin arrangement 66 associated with the backing plate 48 is used, together with other notch and pin arrangements not in view in FIG. 2, to control the thermal expansion of the materials such that the LED arragement 67 maintains alignment even under conditions of high thermal stress and dimensional change during the operation of the printhead.

Figure 3:
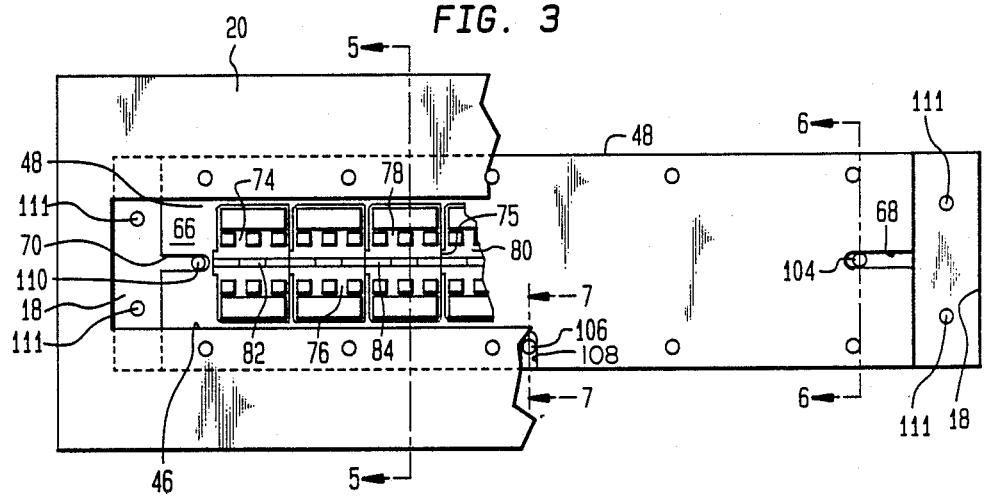
FIG. 3 is a partial top plan view of the printhead with the lens and lensholder removed.

FIG. 3 is a partial top view of the printhead shown in FIG. 2 with the plate and lens assembly removed to illustrate, in more detail, the inner members and components of the printhead. As shown in FIG. 3, the backing plate 48 is positioned underneath the printed circuit board 20 and is centered around the opening 46 in the printed circuit board 20. The backing plate 48 includes the notches 68 and 70 at each end thereof, and an additional notch 108 located at the center of a side of the plate 48. The backing plate 48 is in engagement with the back surface of the printed circuit board 20. Adhered to the backing plate 48 are a plurality of LED circuit assemblies, such as circuit assemblies 74, 76, 78 and 80. The number of LED circuit assemblies attached to the backing plate 48 depends upon the number of LED's desired in the printhead. For example, if the printhead is to provide 400 dots per inch resolution, there would be 400 separate LED regions per inch across the face of backing plate 48. In the preferred embodiment of this invention, each tile or LED circuit assembly would have 384 LED's within a width of 0.960 inches. The overall length of the printhead depends upon the size of the film width which is to be exposed.

The tiles containing the circuit assemblies are attached to the backing plate 48 by a suitable adhesive, such as an epoxy resin, which has suitable bonding and heat conducting properties. Before bonding, the tiles are precisely aligned such that the LED chips on the circuits are aligned in a straight line across the entire printhead structure. Each circuit assembly includes three LED chips, such as LED chips 82 and 84 on circuit arrangements 74 and 78, respectively. Alignment of the tiles or circuit assemblies is facilitated by the projection 75 on one side of each tile which butts against the adjacent tile. These projections allow for a slight rotation of the tiles so that exact alignment can be achieved.

The backing plate 48 is attached to a heat dissipating or heat sinking structure 18 with an appropriate heat conducting compound located therebetween. In order to make a light printhead and one which can be secured and maintained in alignment with the least amount of hardware, the heat sink 18 is constructed of a light weight aluminum material. On the other hand, the backing plate 48 is constructed of a stainless steel material and, likewise, the tiles or members to which the circuit assemblies are bonded are also constructed of a stainless steel material. Stainless steel is used because it has a thermal coefficient of expansion very similar to the integrated circuits and diodes bonded to the tiles in each individual circuit assembly. Therefore, in order to prevent any significant stress developing between the bonds of the circuit tiles and the backing plate 48, similar materials are used. The backing plate and tiles can be constructed of 0.062" thick stainless steel having a gold over nickel plating. However, the aluminum heat sink 18 has a different thermal coefficient of expansion than the stainless steel backing plate 48, thereby presenting the possibility of causing differential expansion stress problems in the printhead structure unless relieved by some structure in the printhead.

The printhead can be expected to be designed around an operating temperature range from $-55°$ C. to $+125°$ C., thereby making it very important that the bonds between the various structures remain intact over this wide operating temperature range. This is accomplished by providing the positioning needed for the circuit tiles by the backing plate which has the same thermal coefficient of expansion as the tiles. This prevents any thermal stress buildup between the tiles and the backing plate as the temperature of the printhead changes. The differential expansion between the backing plate 48 and the structural, rigid aluminum heat sink 18 is compensated for by the notches or slots in the backing plate 48 and associated pins on the heat sink 18 which engage with these notches. Further explanation of the heat induced mechanical stress relief provided by this struccture is included with the discussion of FIG. 8 herein. Openings or holes 111 in the heat sink 18 allow for the attachment of the end plate support members. Since relative movement between the heat sink 18 and the plate 22 is not a factor, the end support members may additionally be pinned to the plate and sink, preferably along the axis of the LED array.

Figure 4:
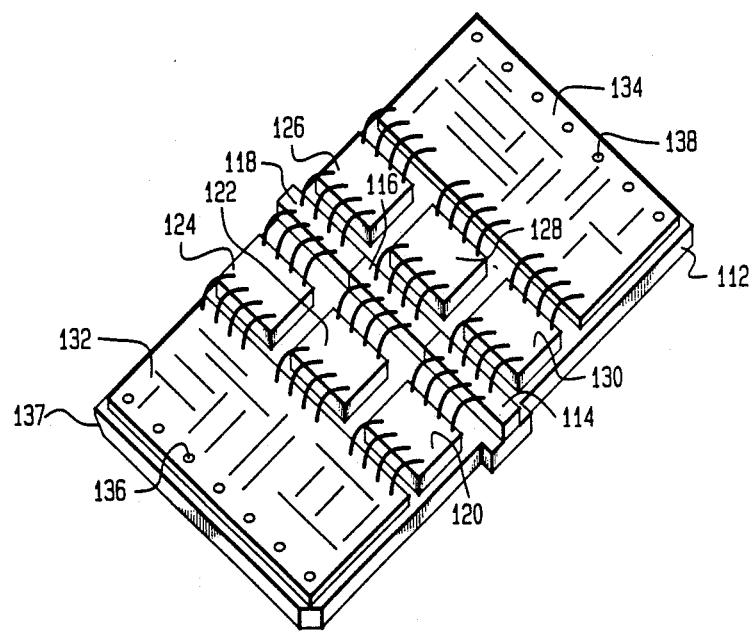
FIG. 4 is a perspective view of a modular circuit tile used in the printhead.

FIG. 4 is a perspective view of a modular circuit assembly, several of which are used in the printhead shown in FIG. 3. The circuit assembly includes the circuit substrate or mounting tile 112 to which the circuit elements and chips are bonded. For example, the LED chips 114, 116 and 118, along with the integrated circuit driver chips 120, 122, 124, 126, 128 and 130 are all attached to the surface of the tile 112. In addition, interconnecting circuit boards 132 and 134 are also attached to the tile 112. The circuit boards 132 and 134 are preferably constructed of a ceramic base material with a gold overlay circuit thereon and are bonded to the tile 112 by a suitable adhesive, such as an epoxy resin adhesive. The interconnecting wires shown in FIG. 4 are small aluminum wires bonded between the various circuit elements to complete the electrical connections therebetween.

It is emphasized that more than the number of connecting wires illustrated may be needed to construct an actual LED circuit assembly. In addition, more or less chips or circuits may be constructed on a separate modular circuit tile, depending upon the number of tiles desired and the degree of density on the tiles which can be tolerated. By putting three LED chips on each tile, with each LED chip containing 128 LED's, a practical fan-out of the connections from the circuit boards 132 and 134 is achieved. In other words, the physical separation between the connecting pads on the circuit boards, such as pads 136 and 138, is such that electrical wire connections to the main printed circuit board 20 can be made easily with existing state of the art wire bonding or other techniques. The tile 112 is constructed of a stainless steel material which has a thermal coefficient of expansion very similar to the integrated circuits bonded thereto, including the Gallium Arsenide LED chips. In the preferred embodiment of the invention, the tiles can be 0.062 inch thick stainless steel containing a 0.0002 inch gold plating over nickel plating. Chamfer 137 permits butted contact between the tiles by allowing an area for the adhesive to flow, instead of flowing between the butted surfaces.

Figure 5:
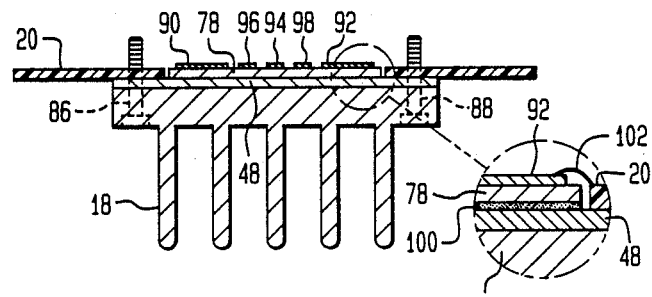
FIG. 5 is a sectional view taken along line 5—5 of FIG. 3.

FIG. 5 is a cross-sectional view of the printhead assembly shown in FIG. 3 taken along line 5—5. The backing plate 48 is positioned between the heat sink 18 and the printed circuit board 20, and is secured thereto by the screws 86 and 88 which extend up into members, such as member 58 shown in FIG. 2. The daughter board tile 78 has the circuit elements bonded thereto, such as the interconnecting circuit boards 90 and 92, the LED chip 94, and the LED driver integrated circuits 96 and 98. The enlarged portion of the figure illustrates the adhesive 100 which bonds the tile 78 to the backing plate 48. In addition, the enlarged area of the figure illustrates the pad or interconnecting wires 102 located between the printed circuit board 20 and the interconnecting circuit board 92. FIG. 5 illustrates the positioning of the board or tile 78 in the opening of the PCB 20 and substantially flush with the surface of the PCB 20.

Figure 6:
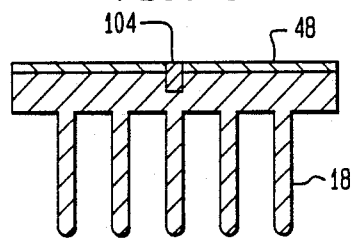
FIG. 6 is a sectional view taken along line 6—6 of FIG. 3.

FIG. 6 is a cross-sectional view taken along line 6—6 of FIG. 3. The heat sink 18 is shown connected to the backing plate 48, with a guide pin 104 securely attached to the heat sink 18 and projecting into the slot in backing plate 48. The pin 110 and guide arrangement at the other end of the backing plate 48 is similar to that shown in FIG. 6. Thus, the plate 48 is restricted in movement with respect to the heat sink 18 laterally across the surface of the heat sink in the directions left and right shown in FIG. 6. It is necessary to maintain this dimension and placement of the backing plate 48 in the printhead since movement of the LED's in either of these directions would disturb and destroy the accurate alignment of the LED's needed to produce sharp images on the photoconductive material.

Figure 7:
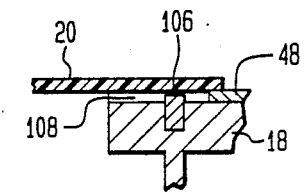
FIG. 7 is a sectional view taken along line 7—7 of FIG. 3.

FIG. 7 is a partial cross-sectional view taken along line 7—7 shown in FIG. 3. Here again, the backing plate 48 is sandwiched between the printed circuit board 20 and the heat sink 18. Guide pin 106 is firmly attached to heat sink 18 and extends into the notch or slot 108 of the backing plate 48. The slot 108 in backing plate 48 provides the actual control of movement of the backing plate 48 with respect to the heat sink 18. Because of its strategic location, the pin and slot arrangement at this position prevents movement of the backing plate 48 with respect to the heat sink 18 except in a direction perpendicular to a line drawn between the other two guide pins, that is, pins 104 and 110, as shown in FIG. 3.

Figure 8:
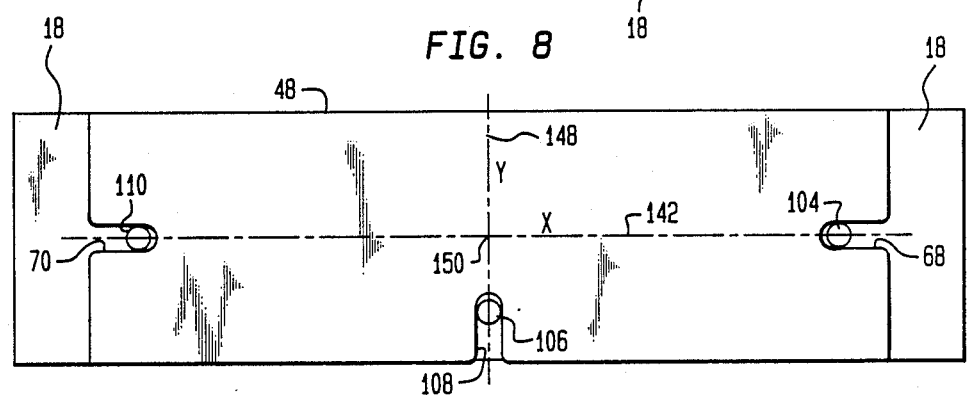
FIG. 8 is a schematic view illustrating the operation and function of the guide pins and slots used in the printhead.

FIG. 8 is a schematic representation of the components involved in the differential expansion improvement capabilities of this invention. According to FIG. 8, the pins 104, 106 and 110 are rigidly supported to the heat sink 18. These pins project into the slots 68, 70 and 108 of the backing plate 48. The x axis 142 and the y axis 148 will be used in describing the operation and characteristics of the members shown in FIG. 8.

Due to the orientation of the pins 104 and 110 and the slots 68 and 70, the plate 48 is free to move only in the x directions, if thermal expansion is not considered. Relative movement of the two surfaces along the y axis is prevented by the outermost pin and slot engagements. On the other hand, pin 106 and slot 108 prevent relative motion between the two surfaces at the y axis in the direction of the x axis. The overall effect of the three pin and slot arrangements produces a thermal expansion characteristic which is tolerable by the LED printhead, primarily because the LED's are positioned along the x axis 142. Assuming that the plate 48 expands more than the heat sink 18, the expansion progresses from the intersection 150 of the two axes. In other words, axes 142 and 148 would remain stationary, but LED's positioned to the right of axis 148 would move linearly along the x axis to the right, and LED's positioned to the left of the y axis would move linearly along the x axis to the left. Because the pins 104 and 110 maintain the x axis at its stationary position, the LED's along the x axis would not migrate or vary in distance along the y axis, even though the plate 48 would expand along the y axis because of the freedom of movement provided by the slot 108 and the pin 106.

The result is that the LED array will not move along the y axis and will move only along the x axis in both directions evenly and outwardly from the y axis. This keeps the center of the LED array at the same position, namely at the intersection 150. Such a change in dimensions of the LED array can be easily tolerated in this type of printhead when the center is maintained. Therefore, even though the plate 48 is free to expand unconfined by the guide members attached to heat sink 18, the positions of the LED's, which are on the tiles attached to the plate 48, do not change sufficiently to affect the performance or pixel-to-pixel alignment tolerance of the LED head. Since the plate 48 expands in a minimal restrained mode, the circuit tiles bonded thereto, as shown in FIG. 3, which are of the same material and expand by the same rate, do not suffer any degradation in the bond between the two surfaces. In addition, the matched expansion along the x axis permits maintained pixel spacing between adjacent tiles, thereby allowing increased resolution in the way of a higher dots per inch rating of the printhead.

Figure 9:
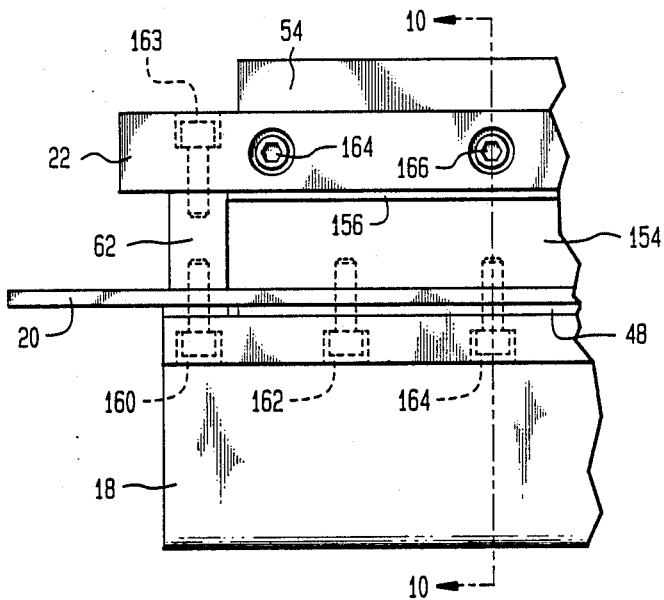
FIG. 9 is a partial side elevational view of an assembled printhead.

FIG. 9 is a partial side elevational view of the printhead shown in FIG. 2 taken substantially from the direction indicated by arrow 152 in FIG. 2. According to FIG. 9, the end support member 62 and the side support member 154 are attached to the heat sink 18, with the printed circuit board 20 and the backing plate 48 located therebetween. Screws 160, 162 and 164 extend through and into each of these members to secure the apparatus. The plate 22, in which the lens 54 is positioned, is attached to the top of the end support member 62. Screw 163 is illustrated as a means for connecting the plate 22 to the end support member 62. Recessed set screws 164 and 166 are used to tighten the lens 54 in the rectangular opening of the plate 22 after the lens has been positioned. A foam gasket material 156 is located between member 154 and the bottom of the plate 22 to provide a dust tight seal around the inner components of the printhead, such as the LED's and the extremely small wire connections between the circuit elements and the circuit boards.

Figure 10:
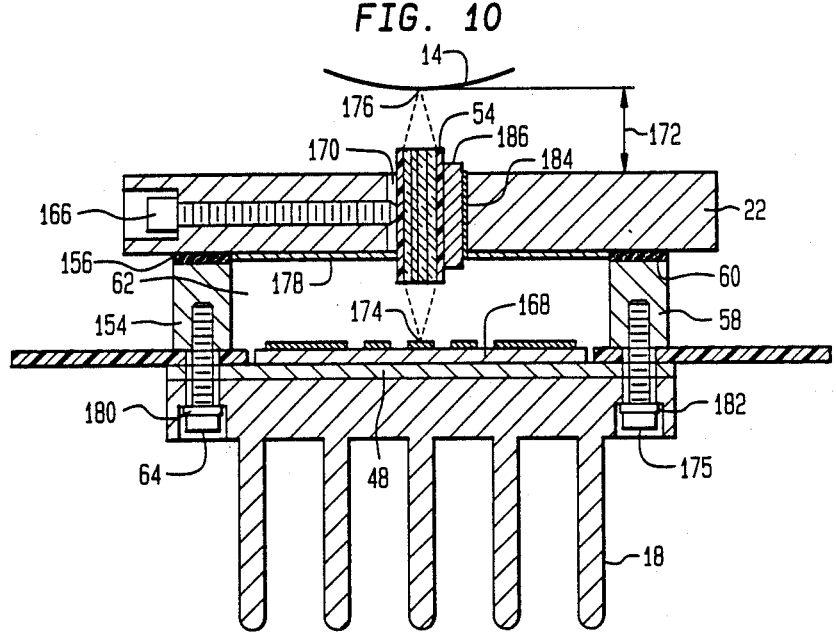
FIG. 10 is a sectional view taken along line 10—10 of FIG. 9.

FIG. 10 is a cross-sectional view taken along the line 10—10 shown in FIG. 9. According to FIG. 10, the enclosed nature of the lens supporting structure can be readily seen. The enclosed system does not require a separate glass cover between the lens and LED's, thereby eliminating any extra loss in light transmission. Plate 22 contains the recessed set screw 166 which is tightened to lock the lens assembly 54 in the rectangular opening 170 of the plate 22. Because the dimension 172 between the photoconductive film 14 and the registration edge or surface of the plate 22 is fixed for all apparatus in which the printhead would be used, it is necessary that the light emitted by the diode array 174 focus exactly at the point 176 on the photoconductive surface or film 14. In order to accomplish this result, it is necessary that the location of the lens 54 within the plate 22, and the location of the plate 22 with respect to the LED array 174, be accurately aligned and set during the manufacture of the printhead. As will be described later herein, the lens 54 can be moved up and down in the plate 22, that is, toward and away from the LED array 174 to provide that measure of alignment, and the distance between the plate 22 and the LED array 174 can be adjusted by inserting a properly sized shim 178 between the plate 22 and the end supporting members, such as member 62.

In order for the printhead mounting system to function properly for alleviating any thermally induced mechanical stresses, there must be means for movement of the components relative to each other. This is provided by the bolt or screws used to attach the members underneath the printed circuit board 20 to the members 58 and 154. Screws 164 and 175 are inserted through openings in the printed circuit board 20 and in the heat sink 18. The screws also extend through oversized holes in the backing plate 48 and into threaded openings in the members 58 and 154. The screws are spring loaded by the lock washer springs 180 and 182 so that a moderate amount of force may be applied to pull together the components of the printhead without securing tightly all of the components to a degree which would prevent movement of the backing plate 48 relative to the other members of the printhead. In other words, the degree to which the screws 164 and 175 are tightened, and the oversize of the openings in the plate 48 for the screws, allow the plate 48 and the daughter boards or circuit tiles, such as tile 168, to move within the tolerance needed for thermal expansion of the board with respect to the expansion of the heat sink 18. Alignment of the lens 54 in the plate 22 in the y direction, or left and right according to FIG. 10, is accomplished by inserting a properly sized shim 184 between the lens structure 54 and the adjacent surface of the rectangular opening in the plate 22. The lens 154 also includes the stiffening, straightening, and locating bar 186 which is securely bonded to the lens stucture. The purpose of this bar will be described in more detail later herein.

Figure 11:
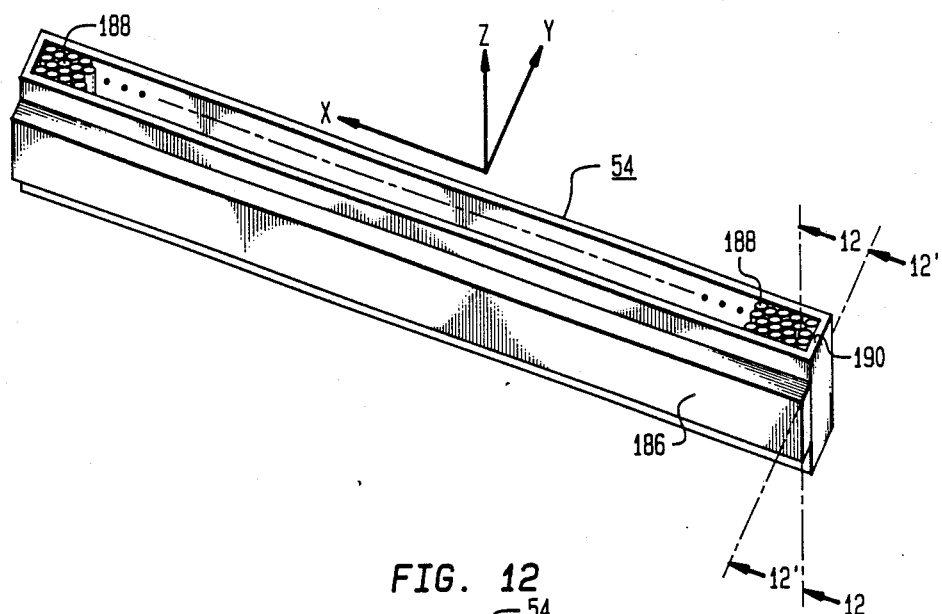
FIG. 11 is a perspective view of the lens assembly used in the printhead.

FIG. 11 is a perspective view of the lens assembly used in the printhead of this invention. As shown in FIG. 11, the lens 54 includes a plurality of fiber optic filaments 188 which are aligned along similar axes and secured in place by the structure or enclosure 190. The lens assembly 54 is a commercially available product manufactured by Nippon Sheet Glass Company, Ltd. under the trademark name of SELFOC. A steel bar 186 is attached and bonded to the side of the lens 54, as shown in FIG. 11. The bar provides three important functions to the lens 54. The bar 186 is used to stiffen the lens 54 to reduce any bow in the lens in the y axis direction. The bar 186 is also used to straighten the lens 54 so that the lens is flat across the fiber optic plane, that is, the lens does not have any deviation in the z direction. Another important function of the bar 186 is to provide a means for locating the exact center of the lens 54.

Figure 12:
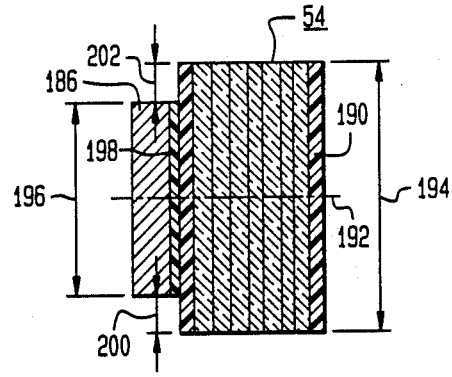
FIG. 12 is a sectional view taken across the plane containing lines 12—12 and 12'—12' shown in FIG. 11.

FIG. 12 is a cross-sectional view taken through the plane containing the lines 12—12 and 12'—12' shown in FIG. 11. The center of the lens assembly is represented by the line 192 in FIG. 12. The overall length of the lens 54 is represented by the dimension 194, and the overall length of the bar 186 is represented by the dimension 196. The bar 186 is bonded to the structure 190 of the lens 54 by a suitable adhesive 198, such as an epoxy resin adhesive.

Although the lens 54 is manufactured to exacting tolerances, it is still possible and frequently the case that the overall length 194 of the lens 54 is within a certain tolerance which is greater than that desired for aligning the lens. Currently available linear lenses have the dimension 194 specified with a tolerance of greater than 5.5 percent deviation from the design standard. Due to the preciseness of the optical focusing required by the lens in an LED printhead, this type of tolerance cannot be tolerated without degrading the performance of the apparatus unless alignment compensates for the deviation. Therefore, the invention makes use of the more precise dimensions of the bar 186 when alignment of the lens is necessary. Bar stock suitable for use as the bar 186 can be readily obtained wherein the dimension 196 has a tolerance of only 0.2 percent, which is approximately 27 times more accurate than that of the dimension 194 of the lens 54. It is this precise tolerance differential between the lens and the bar 186 which is used to advantage in the invention described herein.

The bar 186 is applied to the lens 54 by any method desirable for locating the bar 186 at the exact center of the lens 54. Of the many ways this could be accomplished, one method would be to measure the total length 194 of the lens 54, subtract from that the dimension 196 of the bar 186, divide the result by two to obtain the two dimensions 200 and 202 which would exist at the edges of the lens and bar when the two are positioned with the bar 186 exactly at the center of the lens 54. Other methods, particularly methods geared toward quicker production of such units, may be used within the contemplation of the invention. Regardless of the method used, the result is that the bar 186 is located and attached to the lens 54 at the exact center of the particular lens 54.

Figure 13:
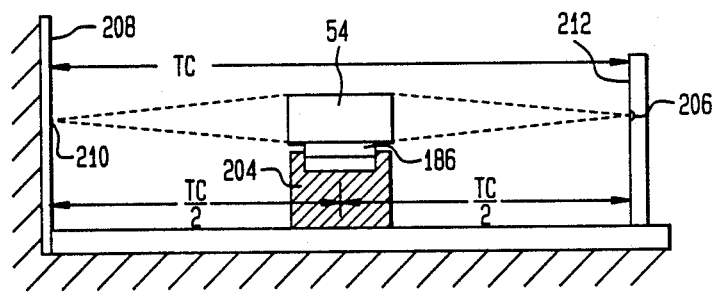
FIG. 13 is a schematic view illustrating a lens alignment technique which makes use of the precise locating bar attached to the lens.

As previously described, the lens 54 must be adjusted inside the opening of the plate 22 to provide the exact focusing distance from the registration edge of the plate 22 so that the printhead will be interchangeable with other apparatus. In making this alignment, it is necessary to adjust or align the lens along the z axis while it is positioned in the plate 22. FIG. 13 shows, schematically, apparatus which can be used to align the lens in the printhead plate 22. Although the printhead plate 22 is not shown in FIG. 13, it is assumed that the lens 54 is positioned in the printhead and is movable in the z direction to properly align the lens.

According to FIG. 13, the lens 54 with the attached locator bar 186 is placed into a holder 204 which is dimensioned to accurately and tightly grasp the bar 186. This can be accomplished since the width of the bar 186 is known to very exacting standards and the holder 204 can be machined or designed to fix the location of the lens based upon these exact dimensions. To the contrary, placing the lens 54 in a fixture designed to grasp the outer extremities of the lens 54 would not provide information as to the exact center of the lens because of the wide variance in the overall length of the lens. Consequently, with the arrangement shown in FIG. 13, the exact center of the lens 54 is automatically located and used by the apparatus to adjust and align the lens in the printhead plate 22.

The alignment procedure ultimately requires that the total conjugate distance TC between the diode 206 and the image plane 208 be established for the lens used. In order for this to occur, the lens 54 must be held at TC/2 during the adjustment for best focus (TC) of the LED 206 at the image plane 208, as shown in FIG. 13. This adjustment is made by moving the holder 204 and the object plane 212 until this condition is achieved. Some apparatus mechanically links the movement of members 204 and 206 such that the member 206 moves twice as far as does member 204, assuming that the image plane 208 remains stationary. In order to use this type of apparatus, it is required that the apparatus know the exact center of the lens 54. Thus, the center alignment provided by the precision bar 186 lends itself very conveniently to this type of lens alignment within the printhead plate 22.

The modular and interchangeable printhead assembly disclosed herein contains a number of important and convenient improvements over printheads known in the prior art. The appended claims specify the subject matter contained herein regarded as the patentable features of the invention. However, it is emphasized that numerous changes may be made in the above-described apparatus without departing from the teachings of the invention. It is also intended that all of the matter contained in the foregoing description, or shown in the accompanying drawings, shall be interpreted as illustrative rather than limiting.

I claim as my invention:

1. A printhead assembly for selectively exposing a moving photoconductive surface to provide a latent image, said printhead comprising:
   a linear array of light emitting diodes (LED's);
   a linear fiber optic lens assembly positioned to focus light from the LED's onto the photoconductive surface, said lens assembly having a first tolerance for the dimension which is parallel to the axis of the fibers in the lens assembly;
   means for mounting the lens assembly a predetermined distance from the LED's; and
   a stiffening, straightening, and locating bar, said bar being bonded to one side of the lens assembly, with a centerline of the bar positioned coincident with a centerline of the lens assembly, and with the tolerance for the dimension of the bar which is parallel to the axis of the fibers being substantially smaller than said first tolerance, thereby permitting convenient lens centerline location during alignment by locating the centerline of the dimensionally accurate bar rather than directly locating the centerline of the dimensionally inaccurate lens assembly.

2. The printhead assembly of claim 1 wherein the lens assembly and bar combination is positioned within a rectangular opening of a supporting plate and held securely therein by at least one set screw.

3. The printhead assembly of claim 1 wherein the stiffening, straightening, and locating bar is constructed of steel.

4. The printhead assembly of claim 1 wherein the stiffening, straightening, and locating bar is attached to the lens assembly by an epoxy adhesive.

5. The printhead assembly of claim 1 wherein the lens assembly contains a plurality of longitudinal glass fibers all aligned parallel to a common axis and surrounded on four sides by an encasement structure, with both ends of the fibers exposed for light transfer.

6. A printhead assembly for selectively exposing a moving photoconductive surface to provide a latent image, said printhead comprising:
   a linear array of light emitting diodes (LED's);
   a linear lens assembly containing a plurality of glass fibers all aligned parallel to a common axis and surrounded on four sides by an encasement structure, with both ends of the fibers exposed for focused light transfer from the LED's to the photoconductive surface;
   a steel stiffening, straightening, and locating bar permanently bonded with an adhesive to one side of the encasement structure, with a centerline of the bar positioned coincident with a centerline of the lens assembly along said common axis, thereby facilitating alignment of the lens assembly by permitting the determination of the lens centerline from the bar rather than from the lens assembly;
   a supporting plate having a rectangular opening therein with the lens assembly and bar combination disposed in said opening and secured by at least one set screw; and
   means for mounting the plate to provide a fixed distance between the lens assembly and the LED's.

7. A printhead assembly for selectively exposing a moving photoconductive surface to provide a latent image, said printhead comprising:
   a circuit arrangement including an array of linear light emitting diodes (LED's) which extend along a first axis, said circuit arrangement including a plurality of modular circuit assemblies bonded to mounting tiles;
   a backing plate to which the tiles are bonded;
   a linear optical lens assembly having glass fibers enclosed by an encasement structure;
   a stiffening, straightening, and locating bar bonded with an adhesive to one side of the encasement structure, with a centerline of the bar positioned coincident with a centerline of the lens assembly along the axis of the glass fibers, thereby permitting alignment of the lens assembly by determining the lens assembly centerline from the bar rather than directly from the lens assembly;
   a printed circuit board (PCB) to which the circuit assemblies are electrically connected;
   a heat dissipating structure;
   means for attaching the lens assembly and bar combination to the heat dissipating structure to form an integral lens assembly-LED combination, said attaching means including a mounting plate having precisely dimensioned surfaces for mounting and registering the printhead in associated apparatus; and means for mounting the backing plate to the heat dissipating structure such that stress buildup between the plate and structure due to differential thermal expansion does not occur.

8. The printhead assembly of claim 7 wherein the mounting plate has a rectangular opening therein with the lens assembly and bar combination disposed in said opening and secured by at least one set screw extending through said mounting plate.

9. The printhead assembly of claim 7 wherein the lens assembly is aligned to focus light from the LED's to a fixed distance from the registration position.

10. The printhead assembly of claim 7 wherein the mounting means includes guide pins and slots which allow for expansion of the backing plate in opposite directions away from the center of the LED arrays and in a direction parallel to said first axis.

11. The printhead assembly of claim 7 wherein the backing plate includes first and second slots at each end thereof, said slots being in alignment with said first axis, and a central slot located centrally along an edge of the backing plate and extending inwardly toward the center of said axis, and wherein the dissipating structure includes first and second guide pins extending therefrom and into respective engagement with said first and second slots, and a central guide pin extending therefrom and into engagement with said central slot.

12. A method of aligning the lens of an LED printhead, said method including the steps of:
    attaching the printhead to focusing apparatus;
    inserting a lens centerline locating bar into a holder of the apparatus which is dimensioned to receive said bar without an appreciable gap therebetween, said bar having a precise dimension and being attached to the lens with centerlines of the bar and lens being coincident;
    moving the holder to focus light through the lens onto an object plane which is a predetermined distance from a registration surface on said printhead; and
    securing the lens in the printhead after the alignment has been made.

13. The method of claim 12 wherein the light which is focused originates from an LED located at an object plane of the apparatus.

14. The method of claim 12 wherein the apparatus is adjustable to move the holder and the object plane simultaneously, with the holder coupled to move one-half the distance of the object plane with respect to the image plane.

* * * * *